(12) United States Patent
Arregui Torres et al.

(10) Patent No.: US 12,479,369 B2
(45) Date of Patent: Nov. 25, 2025

(54) INSTRUMENT PANEL FOR A VEHICLE

(71) Applicant: Ford Global Technologies, LLC, Dearborn, MI (US)

(72) Inventors: Andrea Viviana Arregui Torres, Atizapan de Zaragoza (MX); Esteban Rojas, Nezahualcóyotl (MX); Brent Clifford Dalton, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 18/121,120

(22) Filed: Mar. 14, 2023

(65) Prior Publication Data

US 2024/0308432 A1    Sep. 19, 2024

(51) Int. Cl.
*B60R 7/06* (2006.01)
*E05B 83/30* (2014.01)
*E05F 5/00* (2017.01)

(52) U.S. Cl.
CPC .............. *B60R 7/06* (2013.01); *E05B 83/30* (2013.01); *E05F 5/00* (2013.01); *E05Y 2201/26* (2013.01); *E05Y 2201/716* (2013.01); *E05Y 2201/722* (2013.01); *E05Y 2900/538* (2013.01)

(58) Field of Classification Search
CPC ... B60R 7/06; E05B 83/30; E05B 5/00; E05F 5/00
See application file for complete search history.

(56) References Cited

U.S. PATENT DOCUMENTS

| | | |
|---|---|---|
| 5,484,178 A | 1/1996 | Sandhu et al. |
| 5,904,389 A | 5/1999 | Vaishnav et al. |
| 5,971,461 A | 10/1999 | Vaishnav et al. |
| 7,823,946 B2 | 11/2010 | Hamaguchi et al. |
| 2008/0091309 A1 | 4/2008 | Walker |
| 2019/0063119 A1 | 2/2019 | Sic et al. |
| 2021/0237656 A1* | 8/2021 | Fujita ............... E05D 7/1072 |

FOREIGN PATENT DOCUMENTS

| | | | |
|---|---|---|---|
| AU | 2015202088 A1 * | 1/2016 | ............... B60R 7/06 |
| DE | 102008009315 A1 | 9/2008 | |
| EP | 1503111 A2 * | 2/2005 | ......... B21B 45/0275 |
| EP | 2463465 A2 | 6/2012 | |
| JP | 09020179 A * | 1/1997 | |
| JP | 2004098977 A * | 4/2004 | |
| JP | 2010023748 A * | 2/2010 | |
| JP | 2011131816 A * | 7/2011 | |
| KR | 960004700 U | 2/1996 | |
| KR | 100657708 B1 | 12/2006 | |
| KR | 20120118939 A | 10/2012 | |

* cited by examiner

*Primary Examiner* — Daniel J Colilla
(74) *Attorney, Agent, or Firm* — Vichit Chea; Price Heneveld LLP

(57) ABSTRACT

An instrument panel for a vehicle includes a glovebox aperture and a glovebox assembly. The glovebox aperture is defined by the instrument panel. A perimeter of the glovebox aperture defines an actuation surface and a latch aperture such that the actuation surface and the latch aperture are unitarily formed with the instrument panel. The glovebox assembly includes a storage compartment and a latch assembly. The glovebox assembly is received within the glovebox aperture. The glovebox assembly is operable between a stowed position and a deployed position relative to the glovebox aperture. The latch assembly includes a latch that is configured to be received within the latch aperture when the glovebox assembly is in the stowed position.

19 Claims, 7 Drawing Sheets

INSTRUMENT PANEL FOR A VEHICLE

FIELD OF THE DISCLOSURE

The present disclosure generally relates to vehicles. More specifically, the present disclosure relates to instrument panels for vehicles.

BACKGROUND OF THE DISCLOSURE

Manufacturing processes typically include many steps. When a greater number of components are present in an end product, then the number of steps executed to reach the end product are often correspondingly greater. Accordingly, additional solutions are needed that offer opportunities for streamlining manufacturing processes.

SUMMARY OF THE DISCLOSURE

According to a first aspect of the present disclosure, an instrument panel for a vehicle includes a glovebox aperture and a glovebox assembly. The glovebox aperture is defined by the instrument panel. A perimeter of the glovebox aperture defines an actuation surface and a latch aperture such that the actuation surface and the latch aperture are unitarily formed with the instrument panel. The glovebox assembly includes a storage compartment and a latch assembly. The glovebox assembly is received within the glovebox aperture. The glovebox assembly is operable between a stowed position and a deployed position relative to the glovebox aperture. The latch assembly includes a latch that is configured to be received within the latch aperture when the glovebox assembly is in the stowed position.

Embodiments of the first aspect of the disclosure can include any one or a combination of the following features:
- the storage compartment includes a travel stop that extends outwardly from an exterior surface of a sidewall of the storage compartment, wherein the travel stop is configured to engage with a rearward edge of a portion of the instrument panel that defines the latch aperture;
- the travel stop physically contacts the rearward edge of the portion of the instrument panel that defines the latch aperture when the glovebox assembly is in the deployed position;
- a damper aperture defined by the instrument panel such that the damper aperture is unitarily formed with the instrument panel and a damper assembly coupled to the glovebox assembly, wherein the damper assembly is engaged with the damper aperture;
- the damper assembly is configured to slow a transition of the glovebox assembly from the stowed position to the deployed position;
- the damper assembly includes a rack that defines teeth therein and a damper gear that engages with the teeth defined by the rack, wherein the damper gear provides a drag force that slows actuation of the rack and thereby slows the transition of the glovebox assembly from the stowed position to the deployed position;
- a shaft defined by a lower region of the instrument panel such that the shaft is unitarily formed with the instrument panel;
- the glovebox assembly includes a clip that receives the shaft of the instrument panel, wherein the shaft defines a rotation axis of the glovebox assembly;
- the clip of the glovebox assembly is configured to rotate about the shaft of the instrument panel when the glovebox assembly is transitioned between the stowed position and the deployed position;
- the lower region of the instrument panel defines an aperture therein, wherein the aperture is positioned adjacent to the shaft, and wherein the clip of the glovebox assembly is received within the aperture; and
- the aperture includes an upper portion and a lower portion, wherein the upper portion of the aperture is adjacent to an upper edge of the shaft, and wherein the lower portion of the aperture is adjacent to a lower edge of the shaft.

According to a second aspect of the present disclosure, an instrument panel for a vehicle includes a glovebox aperture and a glovebox assembly. The glovebox aperture is defined by the instrument panel. A perimeter of the glovebox aperture defines an actuation surface and a latch aperture such that the actuation surface and the latch aperture are unitarily formed with the instrument panel. The glovebox assembly includes a storage compartment and a latch assembly. The glovebox assembly is received within the glovebox aperture. The glovebox assembly is operable between a stowed position and a deployed position relative to the glovebox aperture. The latch assembly includes a latch that is configured to be received within the latch aperture when the glovebox assembly is in the stowed position. The storage compartment includes a travel stop that extends outwardly from an exterior surface of a sidewall of the storage compartment. The travel stop is configured to engage with a rearward edge of a portion of the instrument panel that defines the latch aperture. The travel stop physically contacts the rearward edge of the portion of the instrument panel that defines the latch aperture when the glovebox assembly is in the deployed position.

Embodiments of the second aspect of the present disclosure can include any one or a combination of the following features:
- a damper aperture defined by the instrument panel such that the damper aperture is unitarily formed with the instrument panel and a damper assembly coupled to the glovebox assembly, wherein the damper assembly is engaged with the damper aperture;
- the damper assembly is configured to slow a transition of the glovebox assembly from the stowed position to the deployed position;
- the damper assembly includes a rack that defines teeth therein and a damper gear that engages with the teeth defined by the rack, wherein the damper gear provides a drag force that slows actuation of the rack and thereby slows the transition of the glovebox assembly from the stowed position to the deployed position;
- a shaft defined by a lower region of the instrument panel such that the shaft is unitarily formed with the instrument panel;
- the glovebox assembly includes a clip that receives the shaft of the instrument panel, wherein the shaft defines a rotation axis of the glovebox assembly;
- the clip of the glovebox assembly is configured to rotate about the shaft of the instrument panel when the glovebox assembly is transitioned between the stowed position and the deployed position;
- the lower region of the instrument panel defines an aperture therein, wherein the aperture is positioned adjacent to the shaft, and wherein the clip of the glovebox assembly is received within the aperture; and
- the aperture includes an upper portion and a lower portion, wherein the upper portion of the aperture is adjacent to an upper edge of the shaft, and wherein the lower portion of the aperture is adjacent to a lower edge of the shaft.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
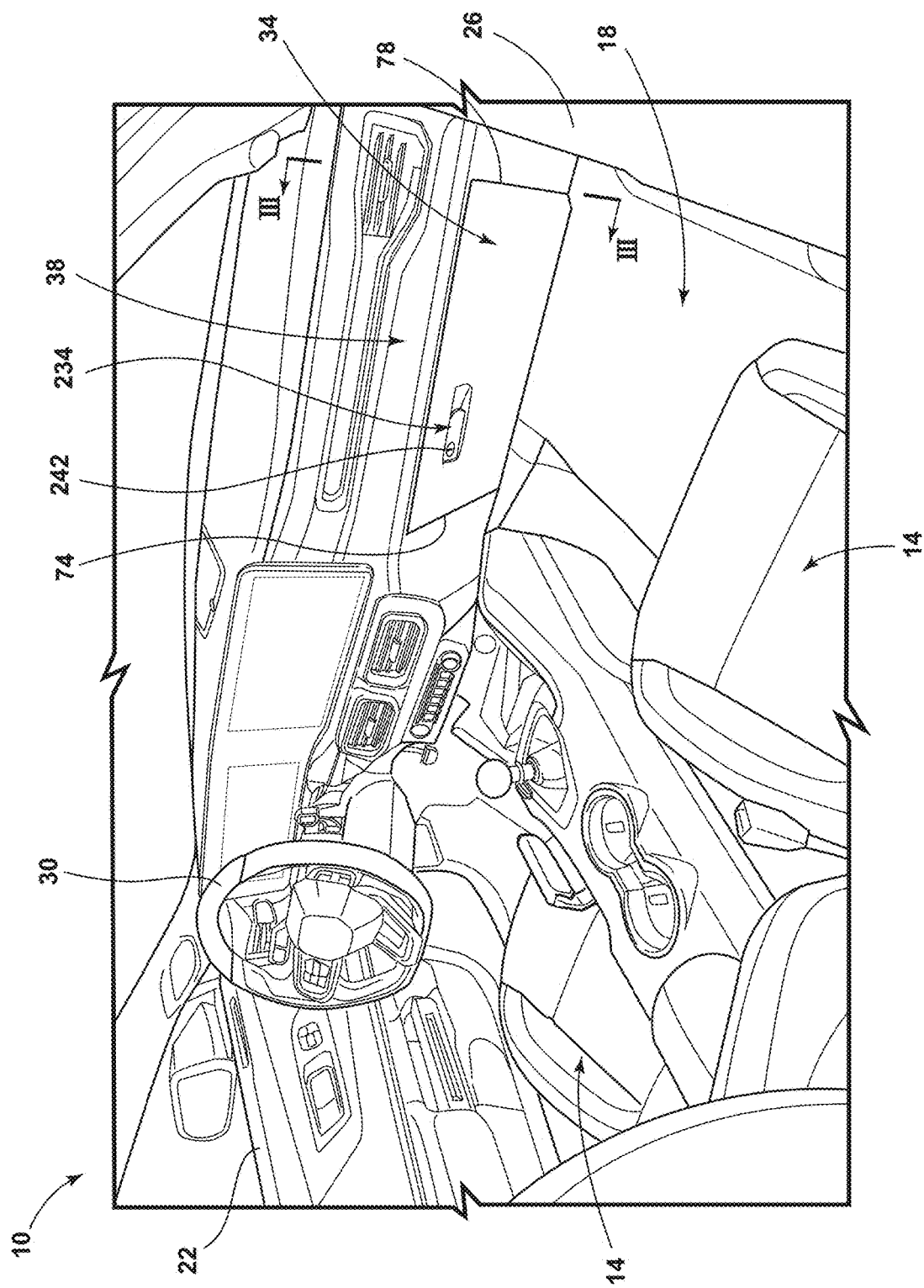
FIG. 1 is a perspective view of a passenger compartment of a vehicle, illustrating an instrument panel and glovebox assembly, according to one example.
Figure 3:
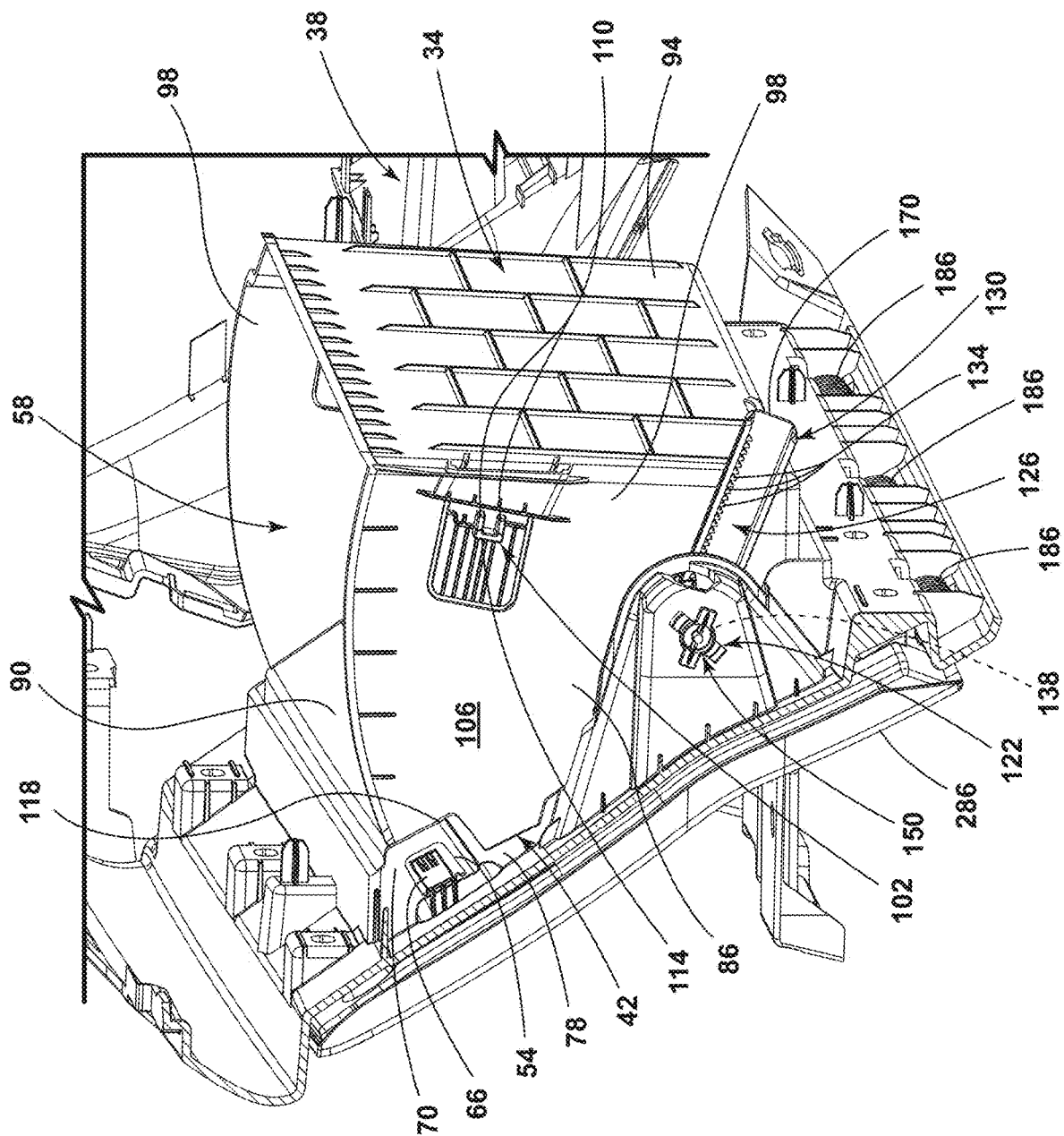
FIG. 3 is a cross-sectional view of the instrument panel, taken along line III-III of FIG. 1, illustrating a latch engaged with the instrument panel on a right side of the glovebox assembly and damper assembly engaged with a damper aperture, according to one example.

For purposes of description herein, the terms "upper," "lower," "right," "left," "rear," "front," "vertical," "horizontal," and derivatives thereof shall relate to the concepts as oriented in FIG. 1 and/or FIG. 3. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an instrument panel for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIGS. 1-7, reference numeral 10 generally designates a vehicle. The vehicle 10 includes one or more vehicle seating assemblies 14 positioned within a passenger compartment 18 of the vehicle 10. For example, one of the vehicle seating assemblies 14 can be positioned on a driver's side 22 of the passenger compartment 18 while another of the vehicle seating assemblies 14 can be positioned on a passenger's side 26 of the passenger compartment 18. The driver's side 22 of the passenger compartment 18 can include various operator controls. For example, in examples where the vehicle 10 is not fully-autonomous, the driver's side 22 can include a steering wheel 30. Alternatively, in examples where the vehicle 10 is fully-autonomous, the driver's side 22 can be the side of the passenger compartment 18 that would have conventionally included the steering wheel 30. The passenger's side 26 of the passenger compartment 18 can be provided with a glovebox assembly 34 that is supported by an instrument panel 38 of the vehicle 10.

Referring again to FIGS. 1-7, the instrument panel 38 for the vehicle 10 includes a glovebox aperture 42 that is defined by the instrument panel 38. A perimeter 46 of the glovebox aperture 42 defines an actuation surface 50 and a latch aperture 54 such that the actuation surface 50 and the latch aperture 54 are unitarily formed with the instrument panel 38. In various examples, the actuation surface 50 and the latch aperture 54 may be immediately adjacent to one another. For example, the latch aperture 54 may be directly coupled to the actuation surface 50. In one specific example, the latch aperture 54 may be positioned immediately vehicle-forward of the actuation surface 50. Said another way, in one specific example, a portion 70 of the instrument panel 38 that defines latch aperture 54 may extend vehicle-forward of the actuation surface 50. In some examples, the portion 70 of the instrument panel 38 that defines the latch aperture 54 may also define the actuation surface 50. The glovebox assembly 34 includes a storage compartment 58 and a latch assembly 62. The glovebox assembly 34 is received within the glovebox aperture 42.

Referring further to FIGS. 1-7, the glovebox assembly 34 is operable between a stowed position and a deployed position relative to the glovebox aperture 42. The latch assembly 62 includes a latch 66 that is configured to be received within the latch aperture 54 when the glovebox assembly 34 is in the stowed position. In various examples, the instrument panel 38 may define the latch aperture 54 opposing sides of the perimeter 46 of the glovebox aperture 42. For example, a first of the latch apertures 54 may be provided in a left side 74 of the perimeter 46 and a second of the latch apertures 54 may be provided in a right side 78 of the perimeter 46. In such an example, the latch assembly 62 can be provided with a first of the latches 66 that is positioned on a left side 82 of the glovebox assembly 34 and corresponds with the first latch aperture 54. Similarly, in such an example, the latch assembly 62 can be provided with a second of the latches 66 that is positioned on the right side 86 of the glovebox assembly 34 and corresponds with the second latch aperture 54.

Figure 2:
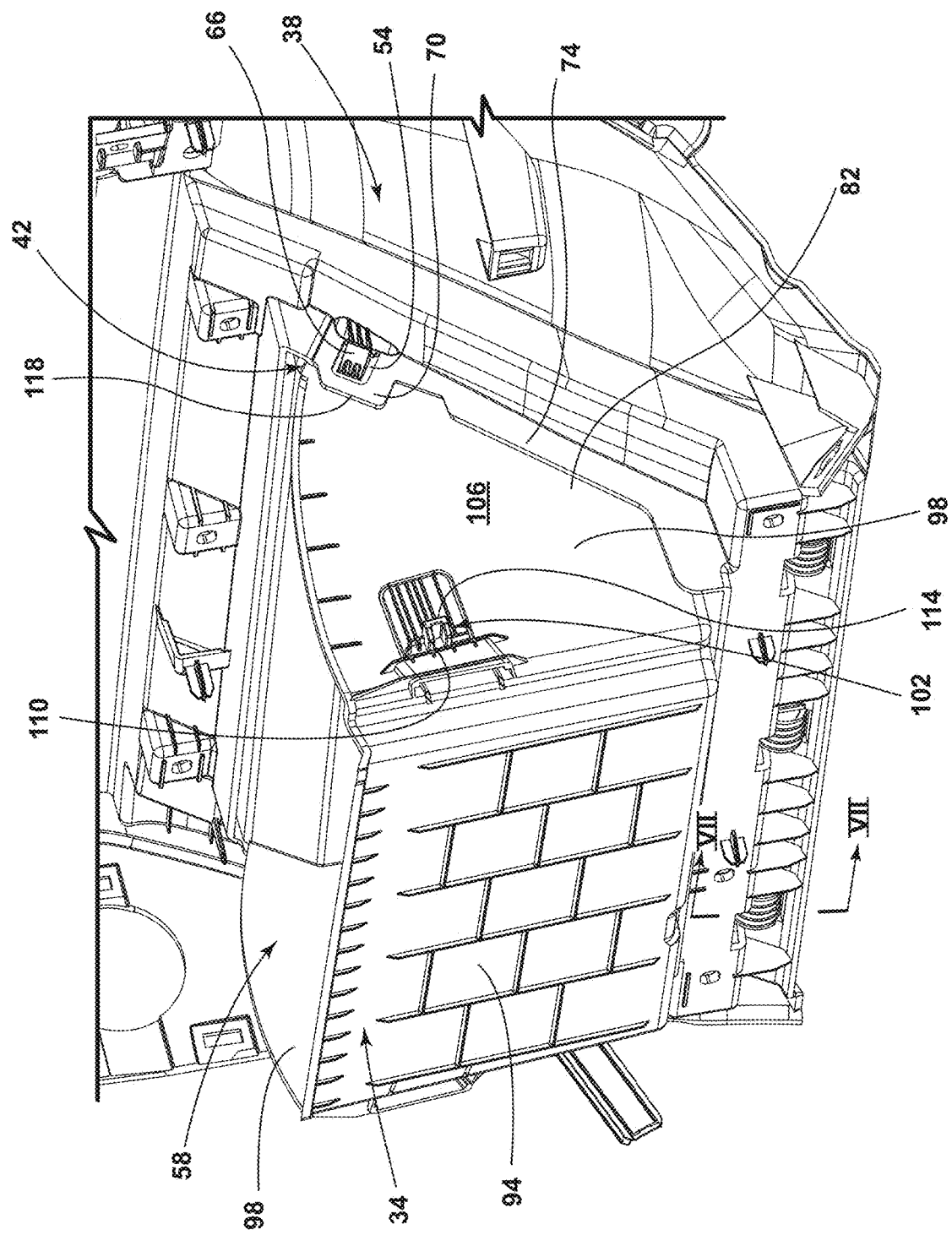
FIG. 2 is a rear perspective view of the glovebox assembly, illustrating a latch engaged with the instrument panel on a left side of the glovebox assembly, according to one example.
Figure 4:
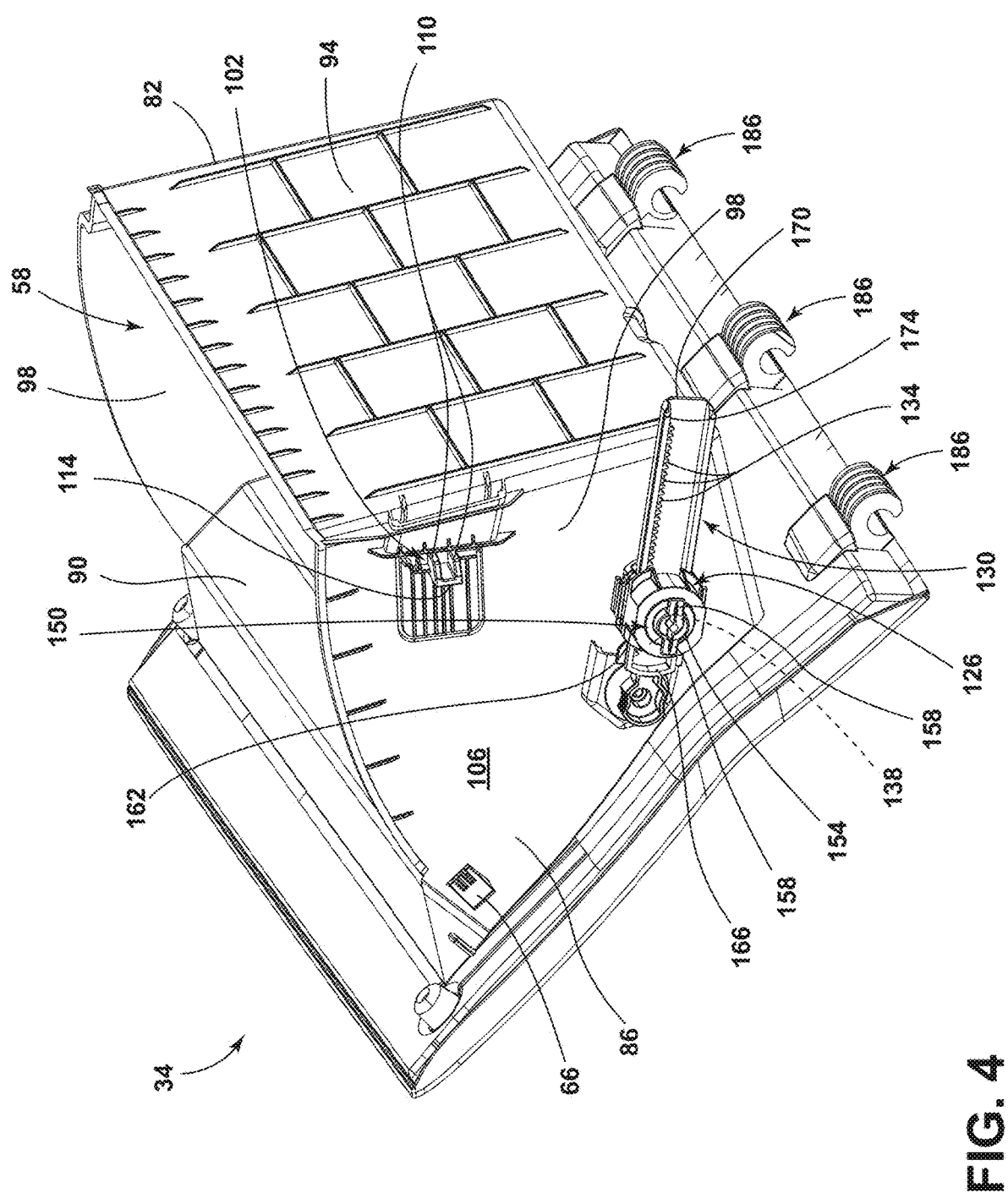
FIG. 4 is a rear perspective view of the glovebox assemble, illustrating the right side of thereof, according to one example.

Referring now to FIGS. 2-4, the storage compartment 58 includes a front wall 90, a rear wall 94, and sidewalls 98 that extend between the front wall 90 and the rear wall 94. The storage compartment 58 may include a travel stop 102 that extends outwardly from an exterior surface 106 of one or more of the sidewalls 98. The travel stop 102 can include one or more support portions 110 that are coupled to a face 114 of the travel stop 102. The support portions 110 can provide structural rigidity to the face 114. In various examples, a lateral thickness of the support portions 110 may decrease as a distance from the face 114 increases. In the context of the support portions 110, the lateral thickness refers to a distance that the support portions 110 extend from the exterior surface 106 of the sidewall 106 (e.g., in a lateral direction of the vehicle 10). The travel stop 102 is configured to engage with a rearward edge 118 of the portion 70 of the instrument panel 38 that defines the latch aperture 54. More specifically, the face 114 of the travel stop 102 is configured to physically contact the rearward edge 118 of the portion 70 of the instrument panel 38 that defines the latch aperture 54 when the glovebox assembly 34 is in the deployed position. Such physical contact between the travel stop 102 and the rearward edge 118 transfers a load of the glovebox assembly 34 (e.g., a weight of the glovebox assembly 34 and/or a weight of items stored within the storage compartment 58) and/or prevents unintentional decoupling of the glovebox assembly 34 from the instrument panel 38.

Figure 5:
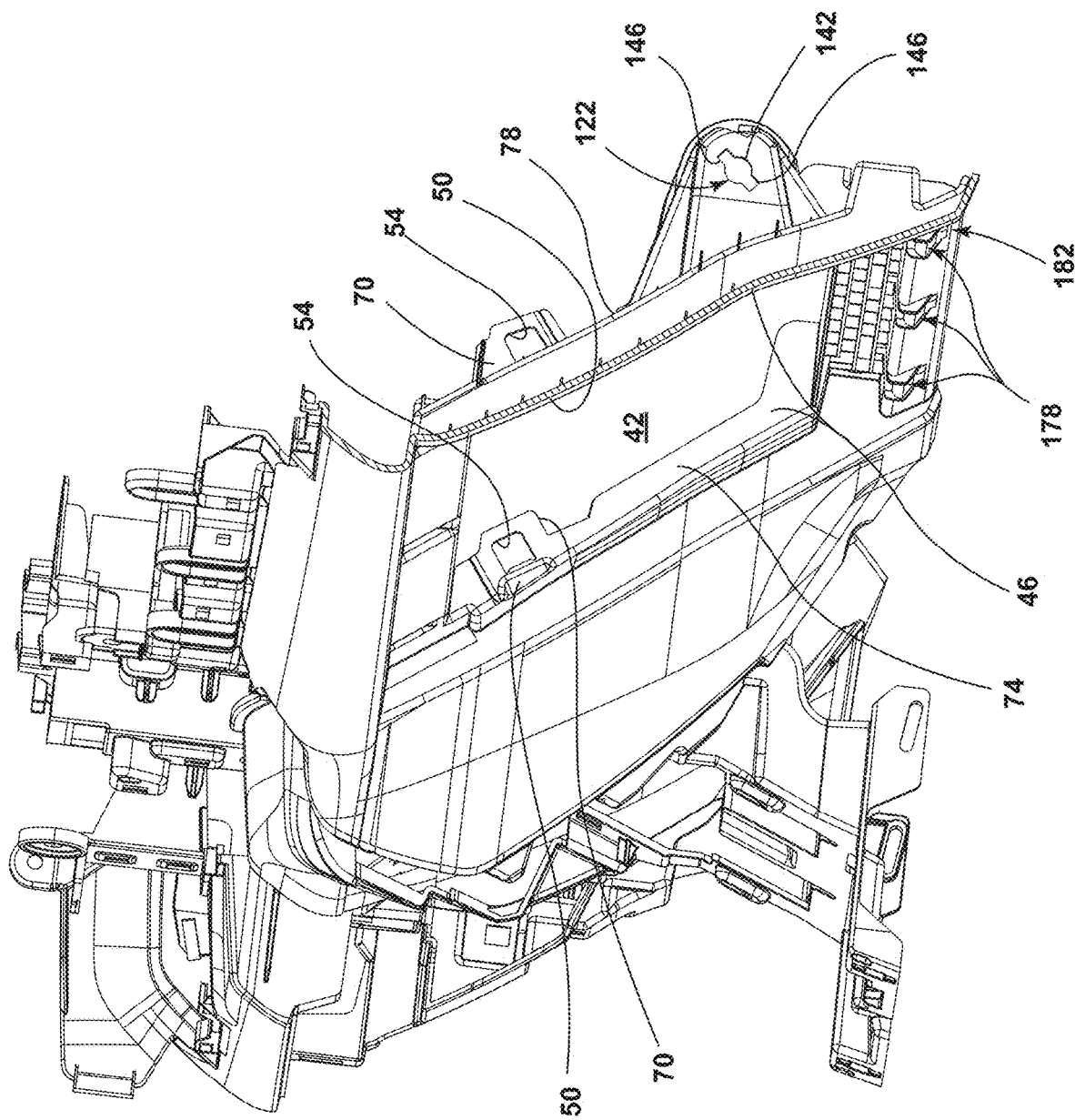
FIG. 5 is a cross-sectional view of the instrument panel, taken along line II-II of FIG. 1, illustrating latch apertures and the damper aperture of the instrument panel, according to one example.

Referring to FIGS. 3-5, the instrument panel 38 can define a damper aperture 122. In various examples, the damper aperture 122 can be unitarily formed with the instrument panel 38. The damper aperture 122 is configured to receive at least a portion of a damper assembly 126 such that the damper assembly 126 engages with the damper aperture 122. The damper assembly 126 is coupled to the glovebox assembly 34. The damper assembly 126 is configured to slow a transition of the glovebox assembly 34 from the stowed position to the deployed position. In some examples, the damper assembly 126 may also be configured to slow a transition of the glovebox assembly 34 from the deployed position to the stowed position. In various examples, the deployed position may be a fully-deployed position or a partially-deployed position. The damper assembly 126 can include a rack 130 that defines teeth 134 therein. The damper assembly 126 can also include a damper gear 138 that engages with the teeth 134 defined by the rack 130. The damper gear 138 is configured to provide a drag force to the rack 130 such that movement of the rack 130 relative to the damper gear 138 can be slowed. For example, the drag force provided by the damper gear 138 can slow actuation of the rack 130 such that the transition of the glovebox assembly 34 from the stowed position to the deployed position is dictated by the damper gear 138 rather than such transition being dictated by gravity alone. The damper assembly 126 can provide a soft-open functionality to the glovebox assembly 34. Such a soft-open functionality can increase a quality perception of an end user and/or may enable a more gentle application of loads that are static or dynamic.

Referring again to FIGS. 3-5, the damper aperture 122 may be oblong in shape. In some examples, the damper aperture 122 can include a central region 142 that has a greater surface area than end regions 146 that extend therefrom. The size and shape of the damper aperture 122 is configured to be complimentary to an engagement feature 150 of the damper assembly 126. In the depicted example, the central region 142 is circular in shape and the end regions 146 are rectangular in shape. The circular shape of the central region 142 and the rectangular shape of the end regions 146 correspond with the shape and size of a middle portion 154 of the engagement feature 150 and end portions 158 of the engagement feature 150, respectively. During assembly, the engagement feature 150 can be inserted into the damper aperture 122 by aligning the middle portion 154 and the end portions 158 with the central region 142 and the end regions 146, respectively.

Referring further to FIGS. 3-5, once the engagement feature 150 has been inserted into the damper aperture 122 and the engagement feature 150 has extended therethrough, the engagement feature 150 may be rotated through an angular displacement of less than one hundred eighty degrees (180°). Such angular displacement can introduce a misalignment between the engagement feature 150 and the damper aperture 122, thereby providing a physical impediment to direct removal of the damper assembly 126. For example, the middle portion 154 of the engagement feature 150 may remain located within the central region 142 of the damper aperture 122 while the end portions 158 of the engagement feature 150 are rotated away from their corresponding end regions 146 of the damper aperture 122. Accordingly, after assembly, the damper assembly 126 can be prevented from unintentional decoupling from the damper aperture 122.

Referring yet again to FIGS. 3-5, the above-described interaction between the engagement feature 150 and the damper aperture 122 anchors in place a housing 162 that contains the damper gear 138. In some examples, the damper gear 138 can be coupled a portion of the housing 162 from which the engagement feature 150 extends. For example, the damper gear 138 can be rotatably coupled to the housing 162 on an opposing interior side of the housing from where the engagement feature is located. In various examples, the damper gear 138 can be positioned within a cavity defined by the housing 162. As the glovebox assembly 34 is transitioned between the stowed positioned and the deployed position, a position of the rack 130 relative to the damper gear 138 and the housing 162 is adjusted. For example, as depicted in FIGS. 3 and 4, when the glovebox assembly 34 is in the stowed position, the damper gear 138 may be positioned proximate to a first end 166 of the rack 130.

Referring still further to FIGS. 3-5, in various examples, the first end 166 of the rack 130 may be nearer to a coupling between the storage compartment 58 and the damper assembly 126 than a second end 170 of the rack 130. When the glovebox assembly 34 is in the deployed position, the damper gear 138 may be positioned proximate to the second end 170 of the rack 130. Engagement between the face 114 of the travel stop 102 and the rearward edge 118 can prevent decoupling of the damper gear 138 and the teeth 134 of the rack 130 when the glovebox assembly 34 is in the deployed position. Additionally, or alternatively, the rack 130 may be provided with a toothless region 174 at the second end 170 thereof that can prevent decoupling of the damper gear 138 and the teeth 134 of the rack 130.

Referring now to FIGS. 4-7, the instrument panel 38 defines one or more shafts 178. More specifically, a lower region 182 of the instrument panel 38 defines one or more shafts 178 such that the one or more shafts 178 are unitarily formed with the instrument panel 38. Each of the one or more shafts 178 is received by a clip 186 of the glovebox assembly 34. Accordingly, a number and positioning of the clip(s) 186 is chosen to correspond with a number and positioning of the shaft(s) 178 such that a one-to-one correspondence exists between the clip(s) 186 and the shaft(s) 178. The one or more shafts 178 define a rotation axis 190 of the glovebox assembly 34. The one or more clips 186 of the glovebox assembly 34 are configured to rotate about the shaft 178 that corresponds thereto when the glovebox assembly 34 is transitioned between the stowed position and the deployed position. In various examples, the shaft(s) 178 may be oblong in shape. In such examples, the shaft 178 can have a major axis 194 and a minor axis 198. An opening 202 defined by each of the one or more clips 186 may be dimensioned to be substantially equal to a thickness of the shaft 178 in the direction of the minor axis 198. My so dimensioning the opening 202, coupling and decoupling of the glovebox assembly 34 with the instrument panel 38 may be facilitated.

Referring again to FIGS. 4-7, when the glovebox assembly 34 is in the stowed position, the clip 186 may solely engage with ends of the shaft 178 that terminate the major axis 194 (e.g., see FIG. 7). Such engagement may similarly be maintained when the glovebox assembly 34 is within a certain angular displacement from the stowed position. For example, the engagement between the clip 186 and the ends of the shaft 178 that terminate the major axis 194 may be maintained within five degrees(5°) of the stowed position, within ten degrees(10°) of the stowed position, within fifteen degrees(15°) of the stowed position, within twenty degrees (20°) of the stowed position, within twenty-five degrees (25°) of the stowed position, within thirty degrees(30°) of the stowed position, within thirty-five degrees(35°) of the stowed position, within forty degrees(40°) of the stowed position, and/or within forty-five degrees(45°) of the stowed position. Once the glovebox assembly 34 has exited the certain angular displacement from the stowed position, the clip 186 may cease engagement with a lower end 206 of the shaft 178 while maintaining engagement with an upper end 210 of the shaft 178. When the glovebox assembly 34 has been angularly displaced from the stowed position to a sufficient extent to result in disengagement between the clip 186 and the lower end 206 of the shaft 178, the clip 186 may maintain contact with the upper end 210, as well as a front surface 214 and a rear surface 218 of the shaft 178. The front surface 214 and the rear surface 218 of the shaft 178 can define the minor axis 198.

Referring further to FIGS. 4-7, the above-described engagement between the clip 186 and the shaft 178 can provide increased resistance to angular displacement of the glovebox assembly 34 within the certain angular displacement from the stowed position. Additionally, the above-described engagement between the clip 186 and the shaft 178 can provide decreased resistance to angular displacement of the glovebox assembly 34 outside of the certain angular displacement from the stowed position. Accordingly, as the glovebox assembly 34 is initially opened, or in the final stages of being stowed, movement of the glovebox assembly 34 may be slowed to a greater extent. Such an arrangement may enhance the longevity of the various components of the glovebox assembly 34 and/or the damper assembly 126.

Referring still further to FIGS. 4-7, the lower region 182 of the instrument panel 38 can define an aperture 222 therein. In such examples, the aperture 222 is positioned adjacent to each of the one or more shafts 178. For example, each of the one or more shafts 178 may be provided with one of the apertures 222 positioned adjacent thereto (e.g., immediately adjacent thereto). Each of the one or more clips 186 can be received within one of the apertures 222. In various examples, the aperture(s) 222 can include an upper portion 226 and a lower portion 230. In such examples, the upper portion 226 may be adjacent to the upper end 210 of the shaft 178 and the lower portion 230 may be adjacent to the lower end 206 of the shaft 178.

Figure 6:
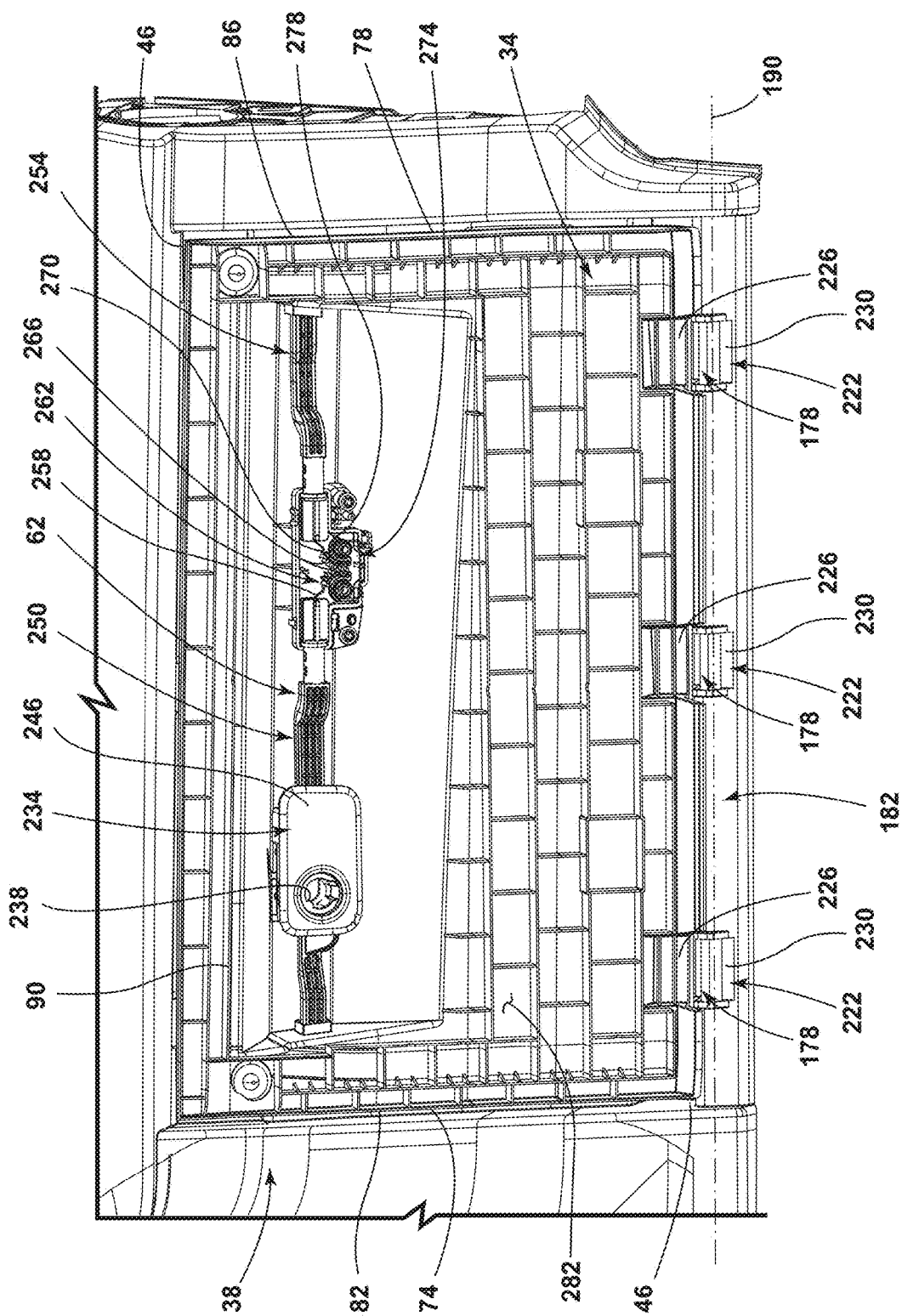
FIG. 6 is a front view of the glovebox assembly and the instrument panel with the cover panel removed to reveal a latch assembly of the glovebox assembly, according to one example.
Figure 7:
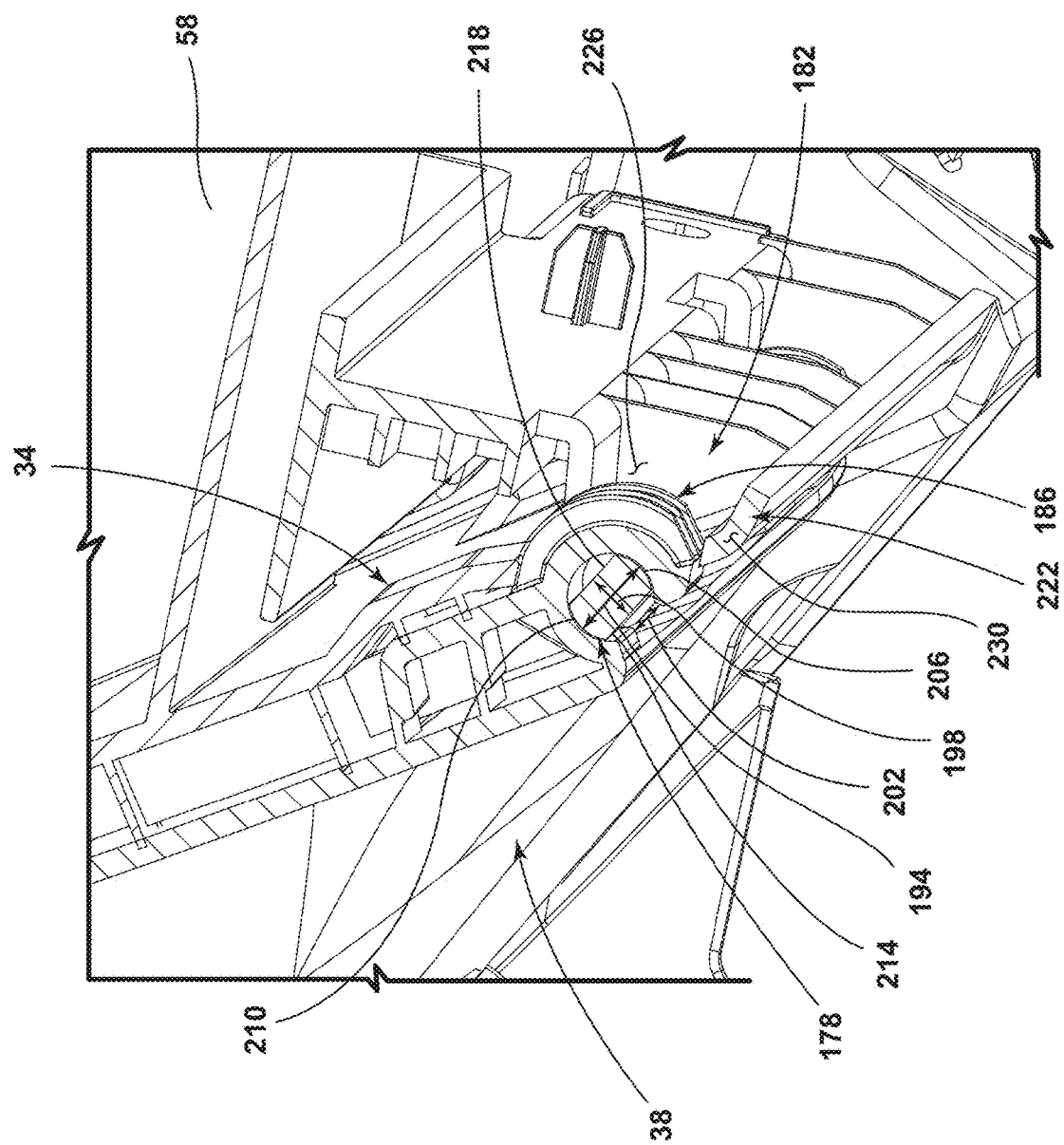
FIG. 7 is an expanded cross-sectional view of the instrument panel and the glovebox assembly, taken along line VII-VII of FIG. 2, illustrating an engagement between a clip of the glovebox assembly and a shaft of the instrument panel while the glovebox assembly is in a stowed position, according to one example.

With specific reference to FIG. 6, the latch assembly 62 of the glovebox assembly 34 includes a handle 234. The handle 234 defines a lock aperture 238 that receives a lock assembly 242 (see FIG. 1). The lock assembly 242 can be selectively lockable by a user to prevent actuation of the handle 234 and thereby prevent unauthorized access to the storage compartment 58. Actuation of the handle 234 by applying an outwardly-directed force to a free end 246 of the handle 234 can induce actuation of a first latch arm 250 and a second latch arm 254. The first latch arm 250 can be associated with the latch 66 that is positioned on the left side 82 of the glovebox assembly 34 (see FIG. 2). Similarly, the second latch arm 254 can be associated with the latch 66 that is positioned on the right side 86 of the glovebox assembly 34 (see FIG. 3). Actuation of the free end 246 of the handle 234 causes the first latch arm 250 and the second latch arm 254 to move toward one another, thereby retracting the latch 66 on the left side 82 and the latch 66 on the right side 86 of the glovebox assembly 34, respectively. Such actuation of the latches 66 on the left side 82 and the right side 86 of the glovebox assembly 34 can disengage the latches 66 from their corresponding latch apertures 54 of the instrument panel 38. Once the latches 66 have been disengaged from their respective latch apertures 54, the glovebox assembly 34 may be rotated from the stowed position toward the deployed position.

With further reference to FIG. 6, actuation of the handle 234 by increasing a distance between the free end 246 of the handle 234 and the front wall 90 of the storage compartment 58 may directly actuate the first latch arm 250 such that the latch 66 on the left side 82 of the glovebox assembly 34 disengages the latch 66 from its corresponding latch aperture 54. Simultaneous to the act of disengaging the latch 66 on the left side 82 from its corresponding latch aperture 54, the first latch arm 250 actuates an arm 258 of a first latch gear 262. Such actuation of the arm 258 causes the first latch gear 262 to rotate (e.g., clockwise). Teeth 266 of the first latch gear 262 are engaged with teeth 270 of a second latch gear 274. As the first latch gear 262 is rotated by actuation of the first latch arm 250, the second latch gear 274 is induced to rotate (e.g., counterclockwise) as a result of a meshing engagement between the teeth 266 and the teeth 270. Rotation of the second latch gear 274 causes actuation of an arm 278 of the second latch gear 274. Similar to the first latch arm 250 and the first latch gear 262, the second latch gear 274 is coupled to the second latch arm 254 such that actuation of the arm 278 results in retraction of the latch 66 on the right side 86 of the glovebox assembly 34. Such retraction of the latch 66 on the right side 86 of the glovebox assembly 34 leads to disengagement of the latch 66 on the right side 86 from its corresponding latch aperture 54.

Referring again to FIG. 6, in the manner described above, actuation of the handle 234 results in a pushing action on an end of the arm 258 and a pulling action on a corresponding end of the arm 278. Such action provides a simultaneous unlatching of the latches 66 on the left side 82 and the right side 86 of the glovebox assembly 34. Once the latches 66 have been disengaged, the glovebox assembly 34 is free to rotate from the stowed position to the deployed position about the rotation axis 190. In various examples, the latch assembly 62 can be at least partially positioned between an outer surface 282 of the front wall 90 of the storage compartment 58 and an interior surface of a cover panel 286 of the glovebox assembly 34 (see FIG. 3). The cover panel 286 can protect components of the latch assembly 62 from items within the passenger compartment 18. The handle 234 can extend through the cover panel 286 to enable a user to easily access the handle 234 for actuation. In various examples, the cover panel 286 may include the clips 186 as unitarily formed therewith (e.g., see FIG. 4).

The instrument panel 38 of the present disclosure may have unitarily formed therewith all of the components with which the glovebox assembly 34 directly engages or directly interacts (e.g., physically contacts). Said another way, each component that the glovebox assembly 34 physically contacts may be integrated with the instrument panel 38 such that the material of the instrument panel 38 is continuous and forms each component that the glovebox assembly 34 physically contacts. Accordingly, manufacture and assembly of the instrument panel may be accomplished in fewer steps and with fewer components. Therefore, the present disclosure represents an opportunity for streamlining a manufacturing process, as well as an assembly process of components of the passenger compartment 18.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An instrument panel for a vehicle, comprising:
   a glovebox aperture defined by the instrument panel, wherein a perimeter of the glovebox aperture defines an actuation surface and a latch aperture protrusion such that the actuation surface and the latch aperture protrusion are unitarily formed with the instrument panel, wherein the latch aperture protrusion comprises at least one latch aperture and extends vehicle rearward along a length of at least one side of the perimeter of the glovebox aperture; and
   a glovebox assembly, wherein the glovebox assembly comprises a storage compartment and a latch assembly, wherein the glovebox assembly is received within the glovebox aperture, wherein the glovebox assembly is operable between a stowed position and a deployed position relative to the glovebox aperture, wherein the latch assembly comprises at least one latch that is configured to be received within the at least one latch aperture when the glovebox assembly is in the stowed position, and wherein the storage compartment comprises a travel stop that extends outwardly from an exterior surface of a sidewall of the storage compartment, and wherein the travel stop is configured to engage with a rearward edge of the latch aperture protrusion.

2. The instrument panel for a vehicle of claim 1, wherein the travel stop physically contacts the rearward edge of the latch aperture protrusion when the glovebox assembly is in the deployed position.

3. The instrument panel for a vehicle of claim 1, further comprising:
   a damper aperture defined by the instrument panel such that the damper aperture is unitarily formed with the instrument panel; and
   a damper assembly coupled to the glovebox assembly, wherein the damper assembly is engaged with the damper aperture.

4. The instrument panel for a vehicle of claim 3, wherein the damper assembly is configured to slow a transition of the glovebox assembly from the stowed position to the deployed position.

5. The instrument panel for a vehicle of claim 4, wherein the damper assembly comprises:
   a rack that defines teeth therein; and
   a damper gear that engages with the teeth defined by the rack, wherein the damper gear provides a drag force that slows actuation of the rack and thereby slows the transition of the glovebox assembly from the stowed position to the deployed position.

6. The instrument panel for a vehicle of claim 1, further comprising:
   a shaft defined by a lower region of the instrument panel such that the shaft is unitarily formed with the instrument panel.

7. The instrument panel for a vehicle of claim 6, wherein the glovebox assembly further comprises a clip that receives the shaft of the instrument panel, and wherein the shaft defines a rotation axis of the glovebox assembly.

8. The instrument panel of claim 7, wherein the clip of the glovebox assembly is configured to rotate about the shaft of the instrument panel when the glovebox assembly is transitioned between the stowed position and the deployed position.

9. The instrument panel of claim 8, wherein the lower region of the instrument panel defines an aperture therein, wherein the aperture is positioned adjacent to the shaft, and wherein the clip of the glovebox assembly is received within the aperture.

10. The instrument panel of claim 9, wherein the aperture comprises an upper portion and a lower portion, wherein the upper portion of the aperture is adjacent to an upper edge of the shaft, and wherein the lower portion of the aperture is adjacent to a lower edge of the shaft.

11. An instrument panel for a vehicle, comprising:
    a glovebox aperture defined by the instrument panel, wherein a perimeter of the glovebox aperture defines an actuation surface;
    a first latch aperture disposed on a first side of the perimeter of the glovebox aperture such that the actuation surface and the first latch aperture are unitarily formed with the instrument panel;
    a second latch aperture disposed on a second side of the perimeter of the glovebox aperture such that the actuation surface and the first latch aperture are unitarily formed with the instrument panel; and
    a glovebox assembly, wherein the glovebox assembly comprises a storage compartment and a latch assembly, wherein the glovebox assembly is received within the glovebox aperture, wherein the glovebox assembly is operable between a stowed position and a deployed position relative to the glovebox aperture, wherein the latch assembly comprises at least one latch that is configured to be received within one of the first and second latch apertures when the glovebox assembly is in the stowed position, wherein the storage compartment comprises a travel stop that extends outwardly from an exterior surface of a sidewall of the storage compartment, wherein the travel stop is configured to engage with a rearward edge of a portion of the instrument panel that defines one of the first and second latch apertures, wherein the travel stop physically contacts the rearward edge of the portion of the instrument panel that defines one of the first and second latch apertures when the glovebox assembly is in the deployed position.

12. The instrument panel for a vehicle of claim 11, further comprising:
    a damper aperture defined by the instrument panel such that the damper aperture is unitarily formed with the instrument panel; and
    a damper assembly coupled to the glovebox assembly, wherein the damper assembly is engaged with the damper aperture.

13. The instrument panel for a vehicle of claim 12, wherein the damper assembly is configured to slow a transition of the glovebox assembly from the stowed position to the deployed position.

14. The instrument panel for a vehicle of claim 13, wherein the damper assembly comprises:
    a rack that defines teeth therein; and
    a damper gear that engages with the teeth defined by the rack, wherein the damper gear provides a drag force that slows actuation of the rack and thereby slows the transition of the glovebox assembly from the stowed position to the deployed position.

15. The instrument panel for a vehicle of claim 11, further comprising:
    a shaft defined by a lower region of the instrument panel such that the shaft is unitarily formed with the instrument panel.

16. The instrument panel for a vehicle of claim 15, wherein the glovebox assembly further comprises a clip that receives the shaft of the instrument panel, and wherein the shaft defines a rotation axis of the glovebox assembly.

17. The instrument panel for a vehicle of claim 16, wherein the clip of the glovebox assembly is configured to rotate about the shaft of the instrument panel when the glovebox assembly is transitioned between the stowed position and the deployed position.

18. The instrument panel for a vehicle of claim 17, wherein the lower region of the instrument panel defines an aperture therein, wherein the aperture is positioned adjacent to the shaft, and wherein the clip of the glovebox assembly is received within the aperture.

19. The instrument panel for a vehicle of claim 18, wherein the aperture comprises an upper portion and a lower portion, wherein the upper portion of the aperture is adjacent to an upper edge of the shaft, and wherein the lower portion of the aperture is adjacent to a lower edge of the shaft.

* * * * *